United States Patent [19]
Christy

[11] Patent Number: 6,119,943
[45] Date of Patent: Sep. 19, 2000

[54] MULTI-LAYER BAR CODE ARRANGEMENT USING WAVELENGTH SEPARATION

[75] Inventor: Orrin D. Christy, North Tonawanda, N.Y.

[73] Assignee: Moore Business Forms, Inc., Grand Island, N.Y.

[21] Appl. No.: 08/355,326

[22] Filed: Dec. 12, 1994

[51] Int. Cl.[7] .................................................. G06K 7/10
[52] U.S. Cl. ..................................... 235/468; 235/462.04
[58] Field of Search .................................. 235/468, 487, 235/488, 462, 472

[56] References Cited

U.S. PATENT DOCUMENTS

| | | | |
|---|---|---|---|
| 2,223,106 | 11/1940 | Humphner | 283/81 |
| 4,066,873 | 1/1978 | Schatz | 235/487 |
| 4,359,633 | 11/1982 | Bianco | 235/468 |
| 4,605,846 | 8/1986 | Duret | 235/468 |
| 4,678,898 | 7/1987 | Rudland | 235/468 |
| 4,685,138 | 8/1987 | Antes | 382/163 |
| 4,694,148 | 9/1987 | Diekemper | 235/468 |
| 4,863,196 | 9/1989 | Ohnishi et al. | 283/82 |
| 4,889,367 | 12/1989 | Miller | 283/88 |
| 4,927,180 | 5/1990 | Trundle et al. | 283/70 |
| 5,005,873 | 4/1991 | West | 283/92 |
| 5,059,776 | 10/1991 | Antes | 235/457 |
| 5,109,153 | 4/1992 | Johnsen et al. | 235/468 |
| 5,151,595 | 9/1992 | Filo | 250/316.1 |
| 5,367,148 | 11/1994 | Storch | 235/375 |
| 5,401,960 | 3/1995 | Fisun | 250/271 |

FOREIGN PATENT DOCUMENTS

| | | |
|---|---|---|
| 0 342 772 | 11/1989 | European Pat. Off. . |
| 2 682 790 | 4/1993 | France . |
| 3839 772 A1 | 5/1990 | Germany . |
| 3173691 | 7/1991 | Japan . |

*Primary Examiner*—Karl Frech
*Attorney, Agent, or Firm*—Nixon & Vanderhye P.C.

[57] ABSTRACT

A substrate capable of receiving and retaining imaging is coded so as to maximize the amount of the scannable information that can be packed into an area, and/or to provide an effective security feature. A first machine readable identification code (e.g. bar code) is imaged on a predetermined area of the substrate, and is opaque to a first predetermined wavelength range of electromagnetic energy (e.g. the infra-red region of light). An overlay is applied over and at least partially covering the first code. The overlay is transparent to the first wavelength range, and opaque to a second wavelength range (e.g. the visible spectrum of light). The overlay may be a security block which substantially completely covers the first code, or may be a second bar code (or additional codes) which is transparent to the second range. The codes may be read by multiple passes of different scanner heads by relative movement between the heads and the substrate, or by a scanner in which first and second (or more) different scanner heads are mounted together so that two different wavelength range bar codes on the substrate may be read at the same time.

1 Claim, 4 Drawing Sheets

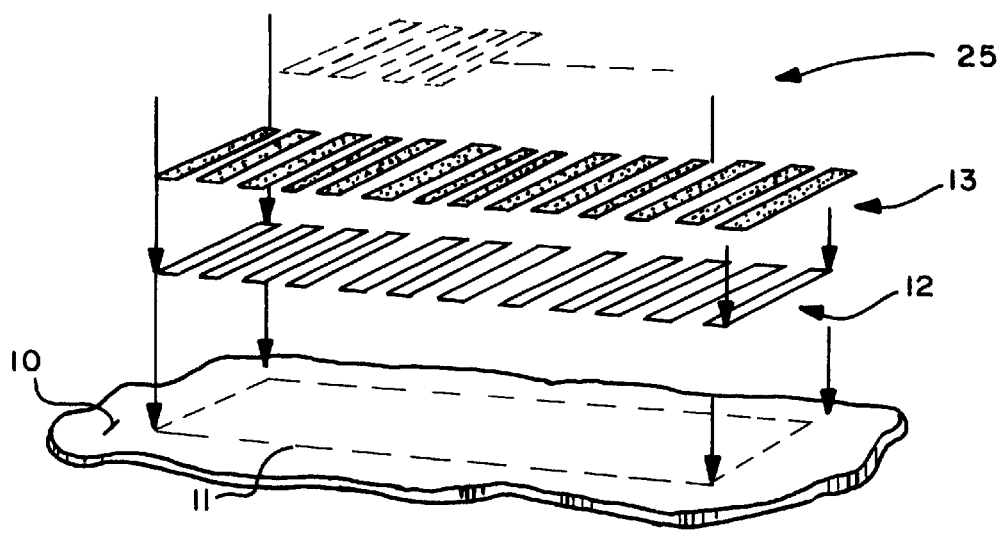
FIG. 1
FIG. 6
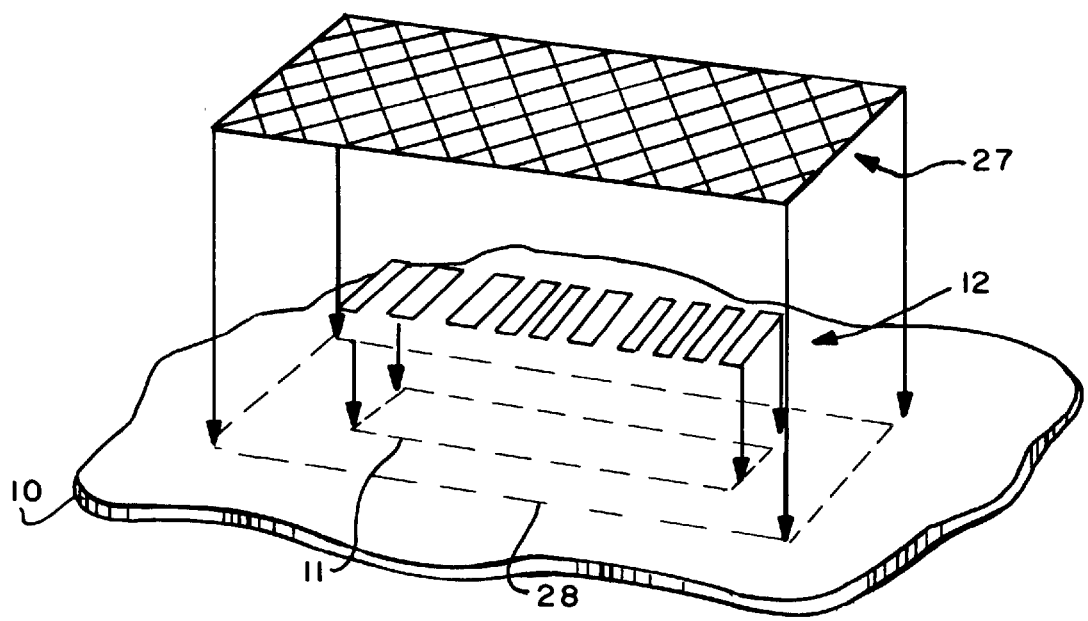

MULTI-LAYER BAR CODE ARRANGEMENT USING WAVELENGTH SEPARATION

BACKGROUND AND SUMMARY OF THE INVENTION

Machine readable bar codes have proliferated into all areas of business. They are produced with any number of technologies on the market today such as laser electrophotography, ink jet, thermal transfer printers, and conventional methods of printing such as mechanical numbering heads and lithographic printing. Among these is the Moore MIDAX technology which uses electron beam (or ion deposition) imaging techniques. Bar codes are commonly scanned by different methods such as the light wand, page scanners, hand held scanning beam pistols, and the familiar scanning beam machine scanners which are found in drug stores and supermarkets.

The vast majority of bar codes are printed as black bars on a white or lightly colored substrate, or in contrasting color bands as found on many consumer packages sporting the UPC bar codes in stores. Scanners of these bar codes work in the visible area of the electromagnetic spectrum or in the infra-red region. A common scanner at the check out area is the familiar red glow of the Helium-Neon laser scanner with a visible wavelength of 632 nM. Other scanners shoot out light in the invisible infra-red area of the spectrum between 800 and 950 nM.

Bar codes today are usually one dimensional, such as those found in the UPC label, code 3 of 9, interleaved code 2 of 5, or code 128. Two dimensional bar codes have also appeared on the market in the form of Cauzin Soft Strips and the UPS two-dimensional bar codes. The quest of using a two-dimensional bar codes, and high density single bar codes is to attempt to pack the maximum amount of information into the minimum amount of space on the package or other printed substrate.

According to the present invention a substrate, a method of coding a substrate, and a scanner utilizable with such a substrate, are provided which do maximize the amount of information in the minimum amount of space on a substrate, being more efficient or effective than two-dimensional bar codes or high density single bar codes. Typically, multiple layers of bar codes or other machine readable codes substantially increase the density of information gathered by the scanner heads within the same scan pass length or area coverage.

The invention also has another aspect. According to the invention it is possible to provide a security feature in which the bar code is not visible to the human eye but yet can be read by a scanner tuned to the correct wavelength range of electromagnetic energy (e.g. substantially the infra-red region of light). This security feature is in contra-distinction to proposals in the prior art, such as in U.S. Pat. No. 5,109,153, in which a photo-sensitive material is applied over a bar code and then—by selective exposure of the photo-sensitive material to high intensity light—the bar code is rendered unreadable, or modified, so that it is no longer read by a scanner as having the same data. Utilizing the security device of the invention a seemingly "invisible" bar code may still readily be scanned by an appropriate scanner.

According to one aspect of the present invention a substrate (such as paper, plastic, film, packaging material, or the like) capable of receiving and retaining imaging thereon is provided. The substrate comprises: A first machine readable identification code imaged on a predetermined area of the substrate, the first code opaque to a first predetermined wavelength range of electromagnetic energy and transparent to a second predetermined wavelength range of electromagnetic energy different from the first range. And, an overlay imaged over and at least partially covering the first code, the overlay transparent to the first predetermined wavelength range of electromagnetic energy and opaque to the second predetermined wavelength range of electromagnetic energy, different from the first range.

Typically the second range is substantially the visible spectrum of light and the first range is substantially the infra-red region of light, although much narrower spectral bandwidths can be utilized within a given region of the electromagnetic spectrum, or other regions of the electromagnetic spectrum (e.g., ultra-violet) can also be utilized.

For security environments, the overlay may comprise a security block which substantially completely covers the first code. The security block is typically applied by litho or flexographic techniques, or imaging applied by ink jet, electrophotographic or electrographic methods, or by electron beam or ion deposition techniques. The first code as well is normally imaged by ink jet, electrophotography, electrography, or be electron beam or ion deposition techniques.

Alternatively, in order to pack the maximum amount of information into the minimum amount of space, the overlay may comprise a second machine readable code, the first machine readable code in this case being transparent to the second predetermined wavelength range of electromagnetic energy. Third or more machine readable codes can also be imaged over and cover the first and second codes, the third code, for example, transparent to the first and second wavelength ranges and opaque to a third wavelength range, to which the first and second codes are transparent. The machine readable codes are preferably bar codes, and the first, second, third and subsequent codes typically comprise toner imaged on the substrate with electron beam or ion deposition techniques, electrophotographic or electrographic methods, or with ink jet.

According to another aspect of the present invention a method of coating a substrate comprises the following steps: (a) Imaging a first machine readable identification code on a predetermined area of the substrate, the first code opaque to a first predetermined wavelength range of electromagnetic energy and transparent to a second predetermined wavelength range of electromagnetic energy different from the first range. And, (b) applying an overlay over and at least partially covering the first code, the overlay transparent to the first predetermined wavelength range of electromagnetic energy and opaque to the second predetermined wavelength range of electromagnetic energy, different from the first range.

Steps (a) and (b) may be practiced so that the second range is substantially the visible spectrum of light and the first range is substantially the infra-red region. Step (b) may be practiced to apply a security block as the overlay, substantially completely covering the first code, by printing using litho or flexo techniques (or by imaging by electron beam or ion deposition techniques, ink jet, electrophotographic or electrographic methods).

Alternatively step (b) may be practiced by imaging a second machine readable code, in which case step (a) is further practiced by imaging the first machine readable code so that it is transparent to the second range. There may be the further step (c) of imaging at least a third machine readable code over and at least partially covering the first and second codes.

There also may typically be the further step of reading the machine readable codes. The reading step may be accomplished using first and second different scanner heads which emit light in the first and second wavelength ranges, respectively, in two different passes. Alternatively the reading step may be accomplished by mounting the first and second different scanner heads together so that both the first and second codes are scanned in a single pass (either by moving the scanner with respect to the substrate, or the substrate with respect to the scanner, or both).

According to yet another aspect of the present invention a scanner for reading machine readable codes, including by emitting light, is provided. The scanner comprises: At least first and second different scanner heads, the first scanner head for emitting light in a first predetermined wavelength range of electromagnetic energy and the second scanner head for emitting light in a second predetermined wavelength range of electromagnetic energy different from the first range. And, means for mounting the scanner heads immediately adjacent each other so that by single pass relative movement between a substrate and the scanner heads two different wavelength range machine readable codes on the substrate may be read at the same time.

The mounting means may comprise a portable housing, and the scanner heads may comprise scanner wands. Alternatively the mounting means may be a structure for mounting the scanners together in a stationary manner, such as in a supermarket check out counter. The second predetermined wavelength range is typically substantially the visible light spectrum, while the first range is substantially the infra-red region.

It is the primary object of the present invention to provide an efficient substrate, method, and scanner that allow the maximum amount of information to be packed in a given area on a substrate, and/or to provide a security feature. This and other objects of the invention will become clear from an inspection of the detailed description of the invention, and from the appended claims.

BRIEF DESCRIPTION OF THE DRAWINGS

FIG. 1 is a is a perspective exploded schematic view showing an exemplary substrate according to the present invention;

FIG. 6 is a view like that of FIG. 1 for yet another embodiment according to the invention.

DETAILED DESCRIPTION OF THE DRAWINGS

FIG. 1 schematically illustrates a substrate 10 according to the present invention. The substrate 10 material itself is typically paper, but may also comprise packaging material, plastic, films, or almost any material capable of receiving and retaining clear machine readable imaging thereon. In a predetermined area—shown in dotted line at 11 in FIG. 1—a first machine readable identification code 12 is imaged on substrate 10. The first code 12 is a bar code, although other machine readable codes may also be utilized. It is typically imaged on utilizing a toner that is applied by electron beam, or ion deposition, or like techniques such as ink jet, electrophotography or electrography. The toner is preferred to be of a spectral response in contrast to that of the substrate 10 in the region of the first predetermined wavelength range of electromagnetic energy, but one that does not interfere with the response of the second code 13. The first code 12 is opaque to a first predetermined wavelength range of electromagnetic energy (e.g. substantially the infra-red region of light), and is transparent to a second predetermined wavelength range of electromagnetic energy different from the first range (e.g. substantially the visible light spectrum).

The substrate of FIG. 1 also comprises a second machine readable code 13 which overlays and at least partially covers the first code 12. The second code 13, also imaged using toner and typically by electron beam or ion deposition techniques, is transparent to the first predetermined wavelength range of electromagnetic energy, and opaque to the second range. As for the code 12, the code 13 is a bar code.

An example of the infra-red-opaque toner that could be utilized for the first code 12 is a blend available from ICMI and known as "QA6-14B" which uses a small percentage load of an infra-red absorbing dye in the toner. The toner used for the second code 13 may comprise a jet ink from a Canon Bubblejet Cartridge (BC-01), which is opaque in the visible spectrum but transparent in the infrared. Alternatively ultra-violet responding toner could be incorporated into the toner used for the top, second code 13.

Figure 2:
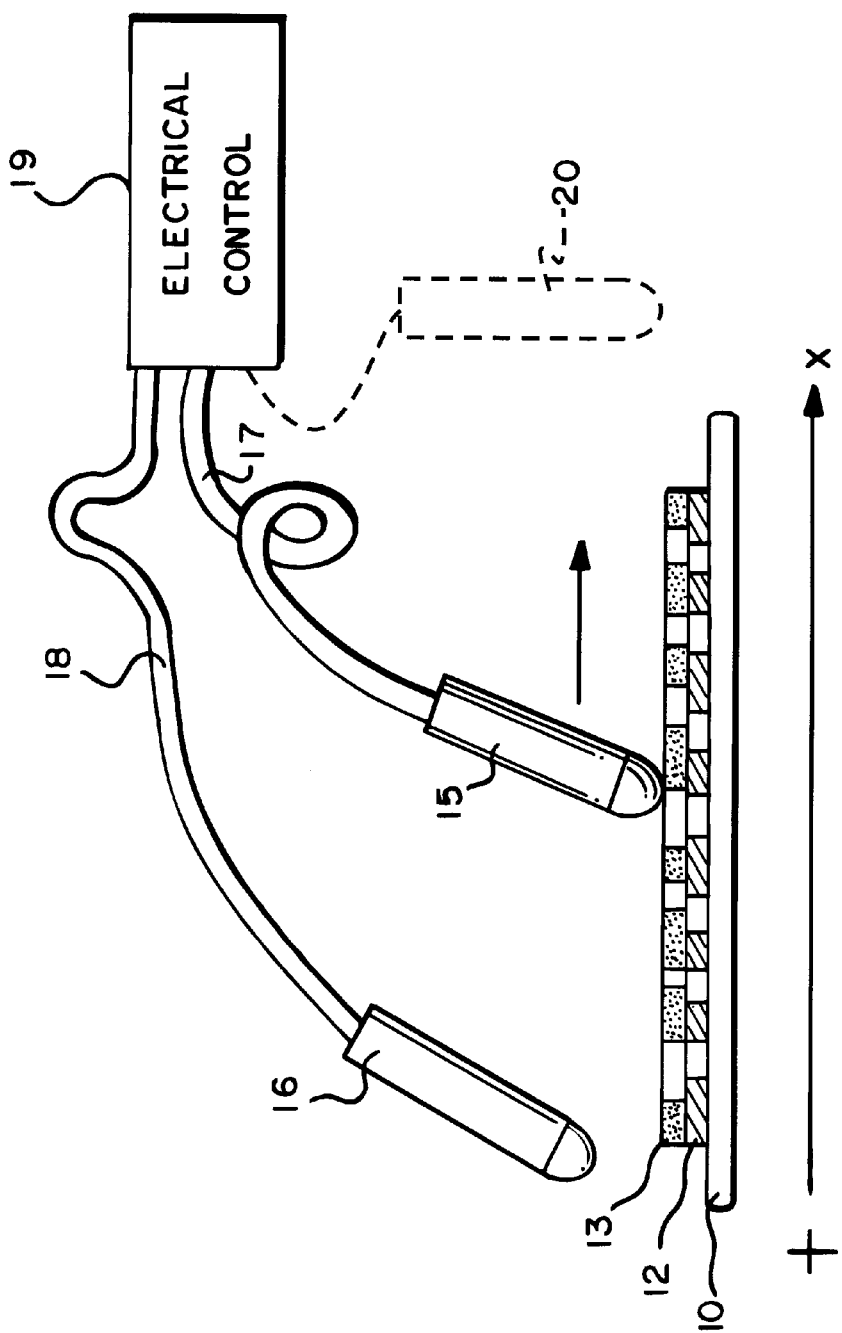
FIG. 2 is a schematic side view of the substrate of FIG. 1 in association with two scanner wands.
Figure 3:
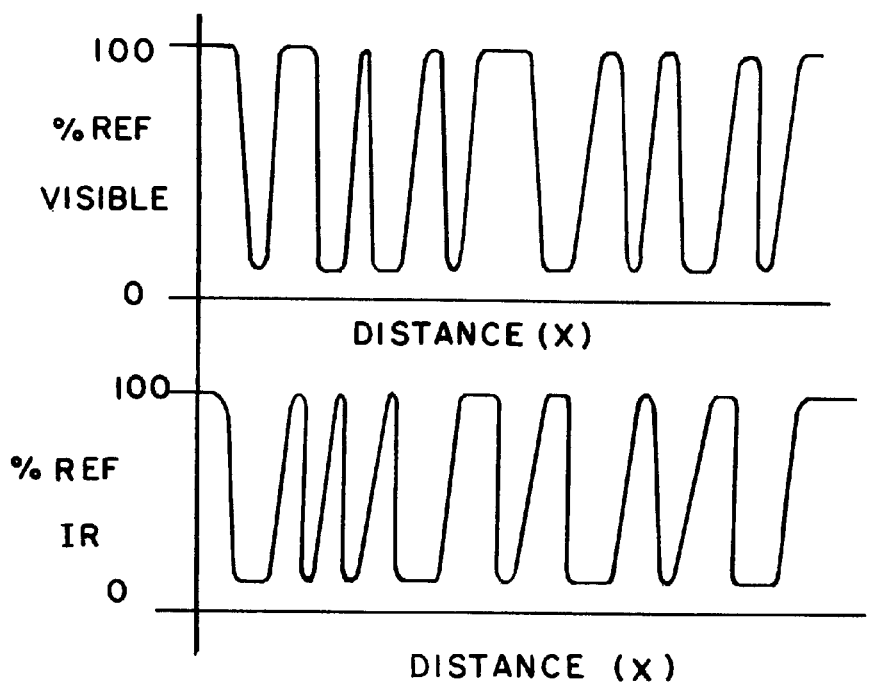
FIG. 3 is an exemplary output from the scanner wands of FIG. 2 after they are passed past the substrate of FIG. 1.

Utilizing the substrate of FIG. 1, more information can be packed into the area 11 than in conventional systems. Both bar codes 12, 13 are capable of being readily scanned, however. FIG. 2 schematically illustrates this. Shown are two different scanner heads 15, 16 connected by leads 17, 18 respectively to an electronic controller 19, all of these elements being conventional per se. The heads 15, 16 are illustrated in FIG. 2 in the form of wand scanners. The head 15 is a scan head which emits light in the visible range, such as an RJS Autoscan bar code verifier designed for the visible range, while the head 16 is designed for the infra-red range (e.g. also an RJS Autoscan). The reflectance plots from the electronic controller 19 are shown schematically in FIG. 3, and this information is ultimately sent to a decoding algorithm to translate signals to useful data. In the FIG. 2 embodiment the bar codes 12, 13 are scanned in two different passes.

Figure 4:
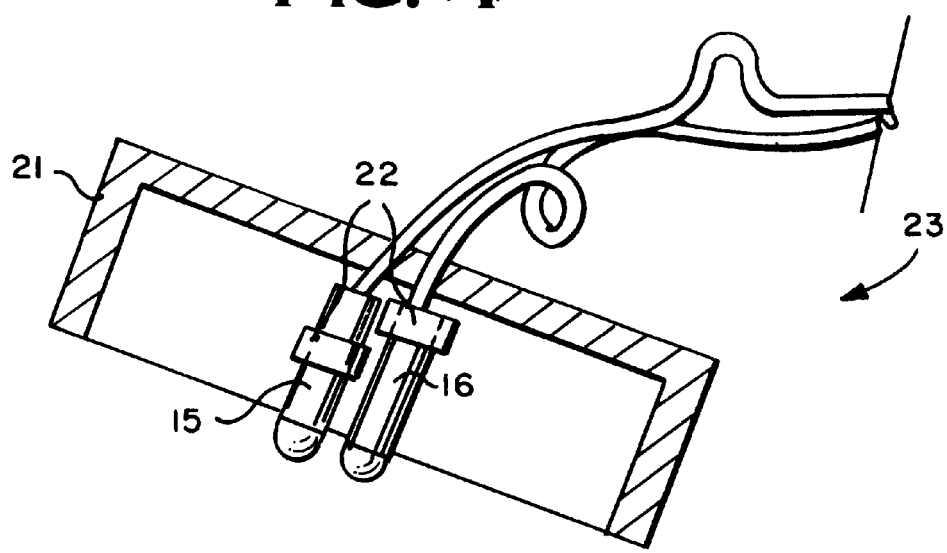
FIG. 4 is an alternative construction in which two scanner heads are mounted in a common housing for movement together.

FIG. 4 illustrates an exemplary scanner according to the present invention in which the heads 15, 16 are mounted by a common housing assembly. The common mounting means may be the housing 21, which is shown in cross-section in FIG. 4, having side walls to which the scanner heads 15 are mounted, as by mounting bands 22. The housing 21 itself may be contoured to easily fit in a user's hand, or to be mounted on an automated piece of equipment. Utilizing the apparatus 23 of FIG. 4 it is possible to read both of the bar codes 12, 13 in a single pass.

While the apparatus 23 is exemplary, a wide variety of different embodiments can also be utilized. For example the mounting means may mount two conventional stationary scanning heads, such as provided in supermarket check out counters, adjacent each other, typically in line in the expected direction of movement of the substrate to be scanned with respect to the scanner heads. Either the scanner heads 15, 16 can be moved relative to the substrate 10, or vice versa, or both can be moved relative to each other at the same time. A single head emitting two (or more) discrete light wavelength ranges also may be utilized.

While the above description is provided for a situation in which there are two bar codes 12, 13, it is to be understood that other bar codes may also be provided within the area 11. This is schematically illustrated at 25 in FIG. 1 by a third bar code 25. The third bar code 25 will be imaged over and at least partially cover the codes 12, 13, and the third code 25 is transparent to the first and second predetermined wavelength ranges, and responsive either by its opacity to a third range or by its ability to fluoresce in the presence of the energy of a third range, while the first and second codes are transparent to that third range. (Reading of the third bar code 25 may be provided utilizing the third reader 20 schematically illustrated in dotted line in FIG. 2.). In order to implement utilization of a third 25, or more, bar codes in the same area 11, dye agents may be utilized which are responsive to very narrow wavelength bands within the infra-red region, or within the visible spectrum, such as available from PitKit. Any number of layers could be utilized as long as the detector (scanner) band pass is narrow enough to prevent interfering cross-talk from other layers of the stacked bar codes.

Figure 5:
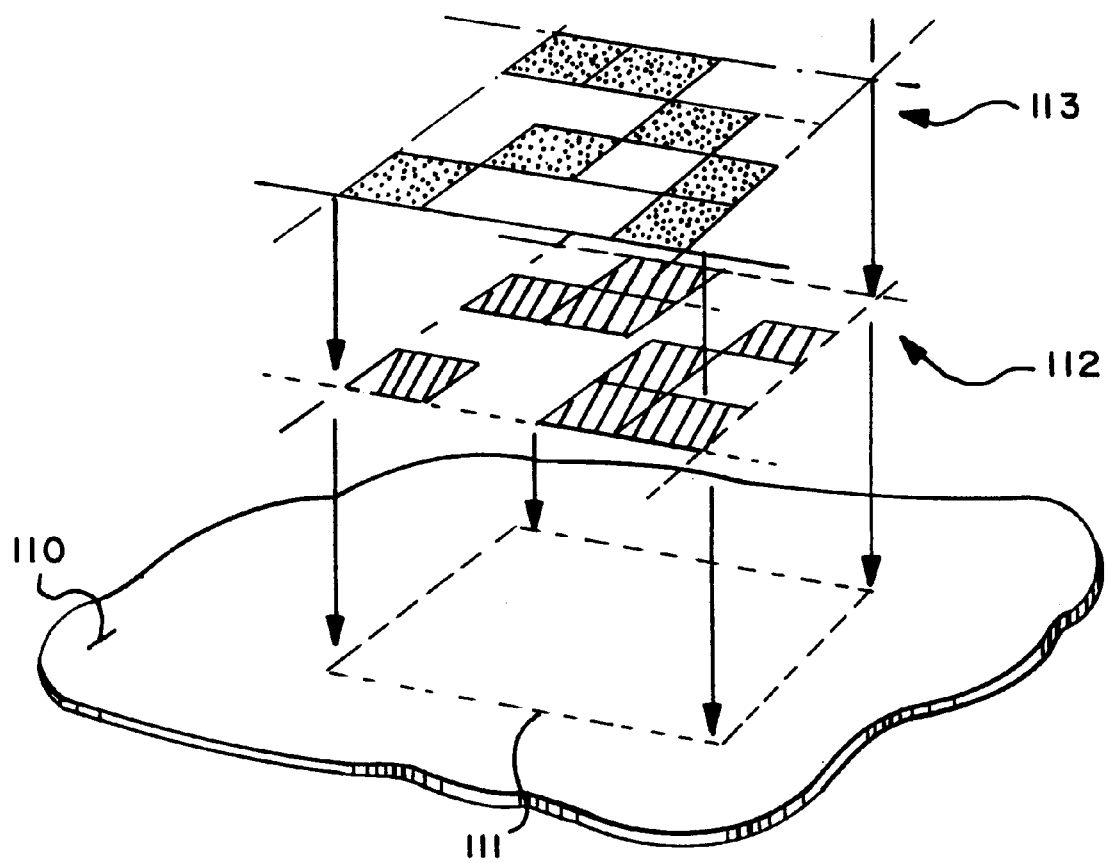
FIG. 5 is a view like that of FIG. 1 for an alternative embodiment of the invention.

FIG. 5 illustrates the basic concept of the invention utilized with two-dimensional bar codes (i.e. adding a third dimension thereto). In this embodiment components comparable to the FIG. 1 embodiment are shown by the same reference numeral only preceded by a "1".

Within the predetermined area 111 of the substrate 110 a first two-dimensional bar code 112 is imaged, and then a second 113 is imaged over the first 112. Bar code layer 112 is typically an IR opaque layer which is transparent to the visible spectrum, while the top bar code layer 113 is composed of toner which is transparent to the infra-red region and opaque to the visible light spectrum.

It will be seen from FIGS. 1–5 that typically multiple layers of bar codes or other machine readable codes substantially increase the density of information gathered by the scanner heads within the same scan pass length or area coverage.

FIG. 6 illustrates another exemplary embodiment according to the present invention. In this embodiments components the same as those of FIG. 1 are shown by the same reference numeral. In the FIG. 6 embodiment the substrate 10 is not designed to pack more information into a small area (although that could be done too by providing two bar codes 12, 13 as illustrated in FIG. 1 and then overlaying them as will be described hereafter); rather the main function of the FIG. 6 embodiment is to provide a security feature which hides the bar code 12 so that it is "invisible". While in the FIG. 1 embodiment the bar code 13 essentially "hides" the bar code 12 so that a security feature is provided there too, the top bar code 13 is readily viewed. In the FIG. 6 embodiment the bar code 12 is not recognizable at all.

In the FIG. 6 embodiment an overlay 27 is provided which substantially completely covers the bar code 12 and the predetermined area 11, in fact covering the overlapping area 28 of the substrate 10. The bar code 12 is as described in FIG. 1 whereas the overlay in the form of a security block 27 comprises toner which is transparent to the wavelength of light to which the code 12 is opaque, and opaque to the second predetermined wavelength range of electromagnetic energy. In this embodiment the code 12 need not be transparent in the visible area of the spectrum so long as the block 27 is sufficiently opaque to hide it.

The block 27 need not be imaged onto the substrate 10, overlaying the code 12, by a toner-based process. Imaging may be done by numerous other processes such as conventional ink jet printing, or conventional litho or flexo printing techniques. The block 27 need not be black but can be any number of different "spot colors", or multiple layers of spot colors.

In one example of implementation of the invention as described above, simulated bars of a bar code 12 were imaged and fixed onto a paper substrate 10 using the ICMI QA6-14B infra-red absorbing invisible toner. These bars were scanned with an RJS Autoscan unit using the infra-red wavelength scanning head. (The exact wavelength and bandwidth is unknown.) The width of the bars were measured at 0.0740". The simulated bars of a bar code 12 were then over printed with a blob 27 of black spot color; and a second bar code using a Canon BJ-10 bubble jet printer. The cartridge used was the Canon BC-01 cartridge with the standard factory ink in it. This was previously tested and founded to be transparent in the infra-red area of the spectrum. When the infra-red scanning head of the RJS Autoscan was placed over the blob of infra-red absorbing invisible toner 27 and the bar code, the only thing which the scan head recorded was the simulated bar code 12 bars underneath, which were created with the IR opaque toner. The bar widths were measured at 0.0742", well within the limits of experimental error.

It will thus be seen that according to the present invention a simple yet effective substrate, method of forming the substrate, and scanner particularly utilizable with such a substrate, have been provided which allow more information to be packed into a predetermined area on a substrate, and/or provide a security feature for a bar code on a substrate. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent products, processes, and devices.

What is claimed is:

1. A scanner for reading machine readable codes, including by emitting light, comprising:

at least first and second different scanner heads, said first scanner head for emitting light in a first predetermined wavelength range of electromagnetic energy and said second scanner head for emitting light in a second predetermined wavelength range of electromagnetic energy different from said first range; and means for mounting said scanner heads immediately adjacent each other so that by a single pass relative movement between a substrate and said scanner heads two different wavelength range machine readable codes on the substrate may be read at the same time; and wherein said second predetermined wavelength range is substantially the visible spectrum of light, and said first range is substantially the infra-red region of light; and wherein said mounting means comprises a portable housing, and said first and second scanner heads comprise scanner wands.

* * * * *

UNITED STATES PATENT AND TRADEMARK OFFICE
CERTIFICATE OF CORRECTION

PATENT NO.   : 6,119,943
DATED        : September 19, 2000
INVENTOR(S)  : Christy It is certified that error appears in the above-identified patent and that said Letters Patent is hereby corrected as shown below:

Column 6,
Line 64, please add the following claims:

2. A method of coding a substrate comprising the steps of:
(a) imaging a first machine readable identification code on a predetermined area of the substrate, the first code opaque to a first predetermined wavelength range of electromagnetic energy and transparent to a second predetermined wavelength range of electromagnetic energy different from the first range;
(b) applying an overlay over and at least partially covering the first code, the overlay transparent to the first predetermined wavelength range of electromagnetic energy and opaque to the second predetermined wavelength range of electromagnetic energy different from the first range;
wherein steps (a) and (b) are practiced so that the second range is substantially the visible spectrum of light and the first range is substantially the infra-red region of light;
wherein step (b) is practiced by imaging a second machine readable code and wherein step (a) is further practiced by imaging the first machine readable code so that it is transparent to the second predetermined wavelength range of electromagnetic energy; and
further comprising the step of (c) imaging at least a third machine readable code over and at least partially covering the first and second codes, the third code transparent to the first and second predetermined wavelength ranges of electromagnetic energy and responsive by opacity of fluorescence to a third predetermined wavelength range of electromagnetic energy different from the first and second ranges; and wherein steps (a) and (b) are practiced so that the first and second codes are transparent to the third range.

3. A method as recited in claim 2 wherein steps (a) and (b) are practiced to provide bar codes as the machine readable codes.

4. A method as recited in claim 2 wherein steps (a) and (b) are practiced by imaging the first and second codes with a toner using electron beam or ion deposition techniques, electrophotographic or electrographic methods, or ink jet.

5. A method as recited in claim 2 comprising the further step (c) of reading the machine readable codes using first and second different scanner heads which emit light in the first and second wavelength ranges, respectively, in two different passes.

6. A method as recited in claim 2 comprising the further step (c) of reading the machine readable codes using first and second different scanner heads which emit light in the first and second wavelength ranges, respectively, and mounted together so that both the first and second codes are scanned in a single pass.

UNITED STATES PATENT AND TRADEMARK OFFICE
CERTIFICATE OF CORRECTION

PATENT NO. : 6,119,943
DATED : September 19, 2000
INVENTOR(S) : Christy

It is certified that error appears in the above-identified patent and that said Letters Patent is hereby corrected as shown below:

<u>Column 6 cont'd,</u>

7. A substrate capable of receiving and retaining imaging thereon, comprising:
a first machine readable identification code imaged on a predetermined area of said substrate, said first code opaque to a first predetermined wavelength range of electromagnetic energy and transparent to a second predetermined wavelength range of electromagnetic energy different from the first range;
an overlay imaged over and at least partially covering said first code, said overlay transparent to said first predetermined wavelength range of electromagnetic energy and opaque to the second predetermined wavelength range of electromagnetic energy different from the first range;
wherein said fist range is substantially the infra-red region of light;
wherein said overlay comprises a second machine readable code, and wherein said first machine readable code is transparent to said second predetermined wavelength range of electromagnetic energy; and further comprising at least a third machine readable code imaged over and at least partially covering said first and second codes, said third code transparent to said first and second predetermined wavelength range of electromagnetic energy different from said first and second ranges, and said first and second codes transparent to said third range.

8. A substrate as recited in claim 7 wherein said machine readable codes are bar codes.

9. A substrate as recited in claim 7 wherein said first and second codes comprise toner imaged on said substrate with electron beam or ion deposition techniques, electrophotographic or electrographic methods, or ink jet.

Signed and Sealed this

Seventeenth Day of June, 2003

JAMES E. ROGAN
*Director of the United States Patent and Trademark Office*